(12) United States Patent
Meernik et al.

(10) Patent No.: US 8,123,262 B2
(45) Date of Patent: Feb. 28, 2012

(54) DAMPING ASSEMBLY FOR REDUCING VIBRATIONS IN A LATCH FOR A VEHICLE DOOR

(75) Inventors: Paul R. Meernik, Redford, MI (US); Andrew J Novajovsky, Grand Blanc, MI (US); Warren J. Meidinger, Lansing, MI (US); Scott W. Thorpe, Milford, MI (US); James H. Shoemaker, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 406 days.

(21) Appl. No.: 12/343,536

(22) Filed: Dec. 24, 2008

(65) Prior Publication Data
US 2010/0154307 A1  Jun. 24, 2010

(51) Int. Cl.
*E05C 3/06* (2006.01)
(52) U.S. Cl. .......... 292/201; 292/DIG. 23; 292/DIG. 56
(58) Field of Classification Search .................. 292/216, 292/201, DIG. 23, DIG. 62, DIG. 22, DIG. 56
See application file for complete search history.

(56) References Cited

U.S. PATENT DOCUMENTS

| 3,726,368 | A  | * | 4/1973 | Taylor ........................... 188/316 |
| 5,836,050 | A  | * | 11/1998 | Rumez et al. ..................... 16/84 |
| 6,318,521 | B1 | * | 11/2001 | Niaura et al. .............. 188/267.1 |
| 7,097,212 | B2 | * | 8/2006 | Willats et al. ..................... 292/1 |
| 7,188,872 | B2 | * | 3/2007 | Kalargeros et al. ........... 292/216 |
| 7,216,402 | B2 | * | 5/2007 | Nishiyama et al. ............. 16/412 |
| 2002/0148075 | A1 | * | 10/2002 | Monig ............................ 16/412 |

FOREIGN PATENT DOCUMENTS

| DE |     10261698 A1 | 7/2004 |
| DE | 102004037299 A1 | 2/2006 |
| DE | 102006049058 A1 | 4/2008 |

* cited by examiner

*Primary Examiner* — Kristina Fulton
(74) *Attorney, Agent, or Firm* — Quinn Law Group, PLLC

(57) ABSTRACT

A damping assembly is disposed within a housing of a latch assembly to slow rotation of a forkbolt as the forkbolt rotates between an over-travel position and a latched position within the housing. The damping assembly includes a first passage and a second passage that are each configured to allow a fluid to flow therein. A restriction passage fluidly connects the first passage and the second passage and increases the pressure of the fluid within the passages. A check valve is configured to allow unidirectional flow of the fluid through the passages. An engagement mechanism is operatively connected to the passages and is configured to engage the forkbolt as the forkbolt rotates between the over-travel position and the latched position. The fluid within the passages reacts against the engagement mechanism to slow rotation of the forkbolt as the forkbolt rotates between the over-travel position and the latched position.

15 Claims, 5 Drawing Sheets

DAMPING ASSEMBLY FOR REDUCING VIBRATIONS IN A LATCH FOR A VEHICLE DOOR

TECHNICAL FIELD

The present invention relates to an assembly for reducing vibrations produced by a latch of a vehicle door.

BACKGROUND OF THE INVENTION

A vehicle typically includes a body defining an opening and a door for closing to cover the opening. A striker is operatively attached to the body of the vehicle and a latch is operatively attached to the door of the vehicle. The latch includes a forkbolt that defines a nose for impacting the striker and a groove for engaging the striker upon impact with the striker. As the door is closed to cover the opening, the forkbolt of the latch may impact the striker. When the forkbolt impacts the striker, the forkbolt rotates from an unlatched position, past a latched position, to an over-travel position. After the forkbolt rotates to the over-travel position, the forkbolt reverses direction and rotates from the over-travel position to the latched position when the forkbolt stops and remains engaged with the striker to hold the door in a closed position.

SUMMARY OF THE INVENTION

A damping assembly is disposed within a housing of a latch assembly. The damping assembly slows rotation of a forkbolt that is rotatably disposed within the latch assembly as the forkbolt rotates between an over-travel position and a latched position when latching a door of a vehicle. The damping assembly includes a first passage and a second passage. The first passage and the second passage are each configured to allow a fluid to flow therein. The first passage defines a first inlet that is configured to allow the fluid to flow into the first passage through the first inlet and a first outlet that is configured to allow the fluid to flow out from the first passage through the first outlet. The second passage defines a second inlet that is configured to allow the fluid that flowed from the first outlet of the first passage to flow into the second passage through the second inlet and a second outlet that is configured to allow the fluid to flow out from the second passage and into the first passage through the first inlet. A restriction passage fluidly connects the first passage and the second passage. A check valve is configured to allow unidirectional flow of the fluid through the passages. The restriction passage is configured to restrict flow of the fluid through the passages to increase a pressure of the fluid within the passages. An engagement mechanism is operatively connected to the passages and is configured to engage the forkbolt as the forkbolt rotates between the over-travel position and the latched position. The fluid within the passages reacts against the engagement mechanism to slow rotation of the forkbolt as the forkbolt rotates between the over-travel position and the latched position.

A latch assembly latches a door of a vehicle. The latch assembly includes a housing, a forkbolt, and a damping assembly. The housing is configured for operative attachment to the door of the vehicle. The forkbolt is rotatably disposed within the housing for rotating between the unlatched and latched position with some range for over-travel beyond the latched position. The damping assembly is disposed within the housing and is in engagement with the forkbolt as the forkbolt rotates between the over-travel position and the latched position. The damping assembly is configured to slow rotation of the forkbolt as the forkbolt rotates between the over-travel position and the latched position.

A method of reducing vibrations from latching a latch of a door of a vehicle with a striker includes engaging a forkbolt with an engagement mechanism of a damping assembly as the forkbolt rotates from an over-travel position to a latched position. The fluid within the damping assembly is pressurized such that the pressurized fluid reacts against the engagement mechanism to slow rotation of the forkbolt as the forkbolt rotates between the over-travel position and the latched position.

By providing a damping assembly for engagement with the forkbolt, the rotation of the forkbolt is slowed as the forkbolt rotates between the over-travel position and the latched position. By slowing the rotation of the forkbolt between these positions, noise and vibrations that are typically emitted from latching the door may be reduced or eliminated.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
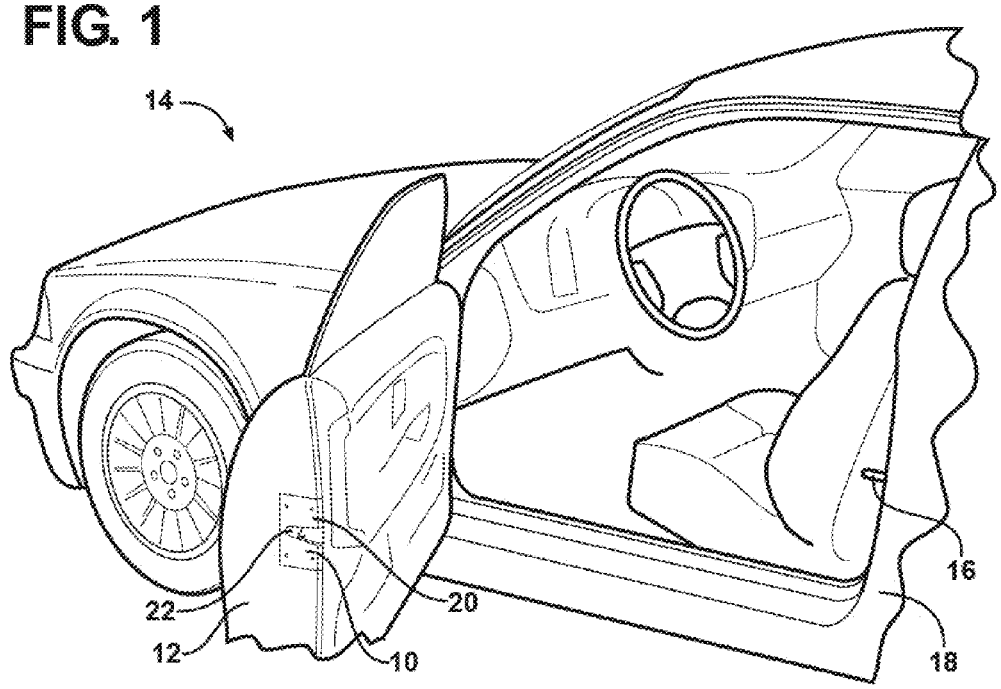
FIG. 1 is a partial perspective view of vehicle having a body with a striker and a door with a latch for engaging the striker when the door is closed relative to the body.

Referring to the drawings, wherein like reference numbers refer to like components, FIG. 1 shows a latch assembly 10 disposed within a door 12 of a vehicle 14 for latching the door 12 to a striker 16, attached to a body 18 of the vehicle 14. The door 12 of the vehicle 14 is latched, or engages, a striker 16 that is mounted to a body 18 of the vehicle 14. The latch assembly 10 includes a housing 20 for operative attachment of the latch assembly 10 to the door 12 of the vehicle 14. A forkbolt 22 is rotatably disposed within the housing 20. This means that the forkbolt 22 rotates from an unlatched position, past a latched position, to an over-travel position. Then, the forkbolt 22 changes rotational direction and rotates from the over-travel position to the latched position to engage the striker 16 and hold the door 12 in a closed position. Movement of the forkbolt 22 from the unlatched position to the latched position is facilitated by closing the door 12 such that the forkbolt 22 impacts the striker 16. The impact with the striker 16 causes the forkbolt 22 to rotate and wrap around the striker 16. Momentum from impacting the striker 16 causes the forkbolt 22 to rotate past the latched position to the over-travel position while the forkbolt 22 engages the striker 16. The forkbolt 22 then rebounds from the over-travel position to the latched position to rest and remain at the latched position while engaging the striker 16 and holding the door 12 in the closed position.

A damping assembly 24 is disposed within, and may be operatively connected to the housing 20 of the latch assembly 10. The damping assembly 24 is in engagement with the forkbolt 22 as the forkbolt 22 rotates between the over-travel position and the latched position. By virtue of the engagement with the forkbolt 22, the damping assembly 24 slows rotation of the forkbolt 22 as the forkbolt 22 rotates between the over-travel position and the latched position to reduce vibrations and noise that are produced when the forkbolt 22 is stopped by engagement with a detent lever 30 at the latched position.

The forkbolt 22 includes an outer periphery 26, which may be non-uniform. The periphery of the forkbolt 22 may include a radially projecting nose 28. A detent lever 30 may be rotatably disposed in the housing 20. The detent lever 30 meshes with the nose 28 of the forkbolt 22 as the forkbolt 22 rotates to hold the forkbolt 22 in the latched position. The damping assembly 24 may engage the forkbolt 22 proximate the periphery 26. In addition, the forkbolt 22 may define a groove 32 where the nose 28 extends into the groove 32. The striker 16 may be disposed within the groove 32 when the forkbolt 22 is in the latched position. The nose 28 of the forkbolt 22 may impact the striker 16 such that the striker 22 is guided down the nose 28 and into the groove 32.

The damping assembly 24 defines a first fluid region A, having a first volume V1, and a second fluid region B, having a second volume V2. The damping assembly 24 also includes an engagement mechanism 40. The engagement mechanism 40 engages the forkbolt 22 to slow rotation of the forkbolt 22. The fluid F flows between the first fluid region A and the second fluid region B. The fluid F may be a hydraulic fluid such as oil and the like. It should be appreciated, however, that other fluids known to those skilled in the art may also be used. The fluid F within the first fluid region A and/or the second fluid region B operatively acts on the engagement mechanism 40 to slow rotation of the forkbolt 22 as the forkbolt 22 rotates between the over-travel position and the latched position.

Figure 2:
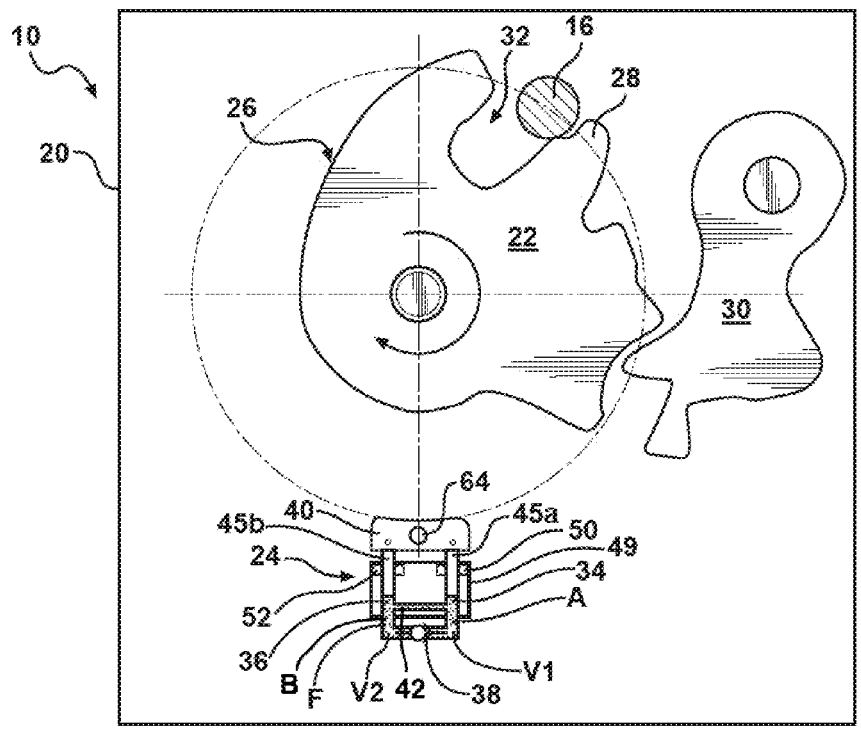
FIG. 2 is a schematic partial cross-sectional view of the latch having a forkbolt and a damping assembly with the forkbolt in an unlatched position.
Figure 3:
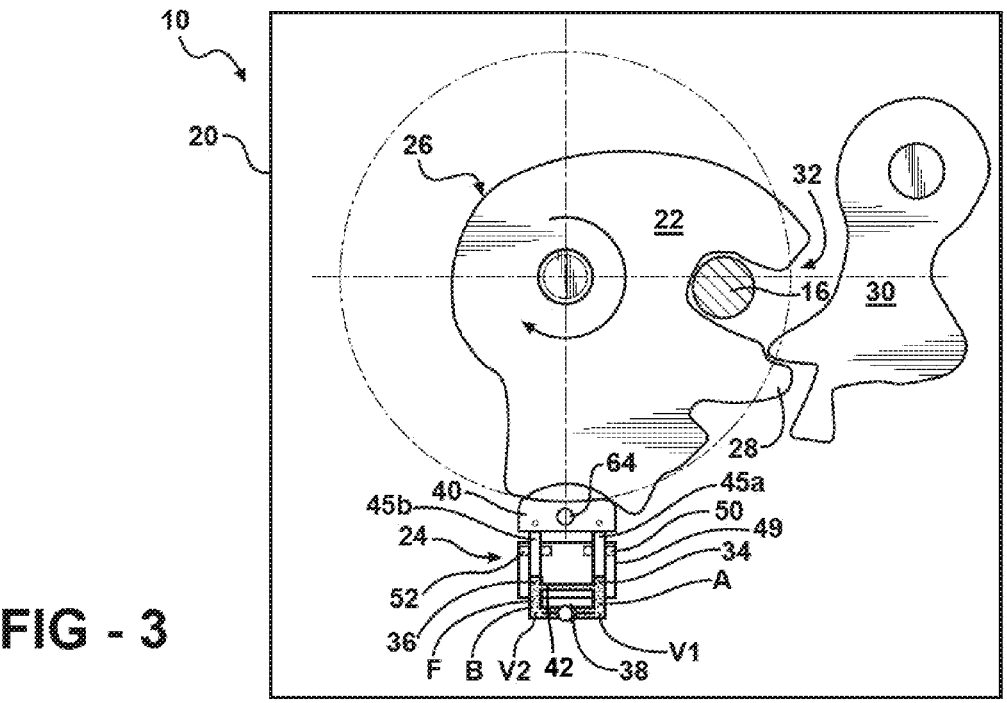
FIG. 3 is a schematic partial cross-sectional view of the latch of FIG. 2 with the forkbolt in a latched position
Figure 4:
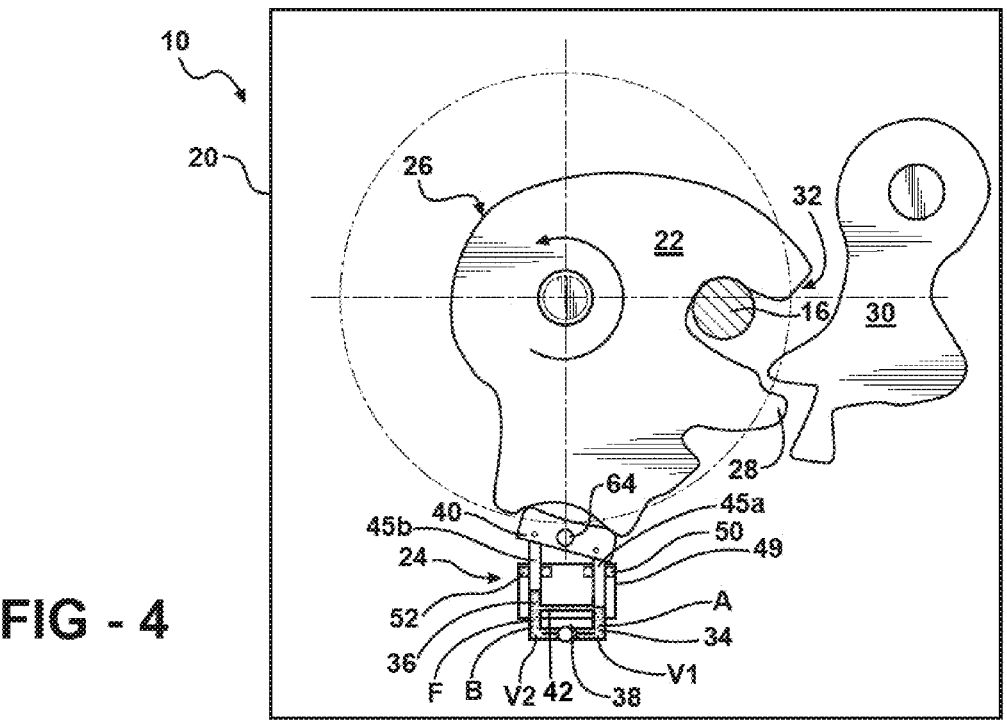
FIG. 4 is a schematic partial cross-sectional view of the latch of FIG. 2 with the forkbolt engaging the striker in an over-travel position.
Figure 5:
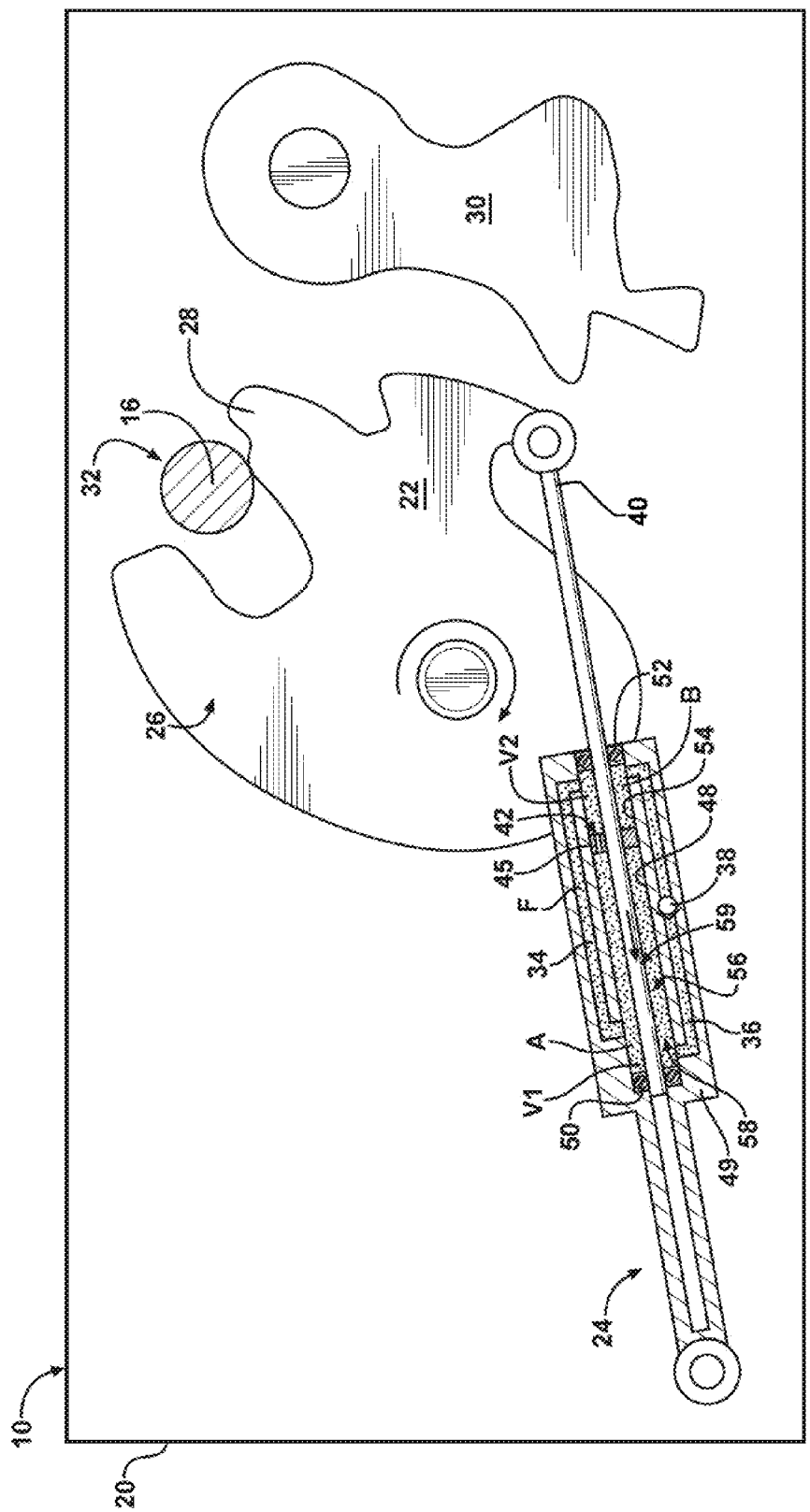
FIG. 5 is a schematic partial cross-sectional view of an alternative embodiment of the latch with the forkbolt in the unlatched position.
Figure 6:
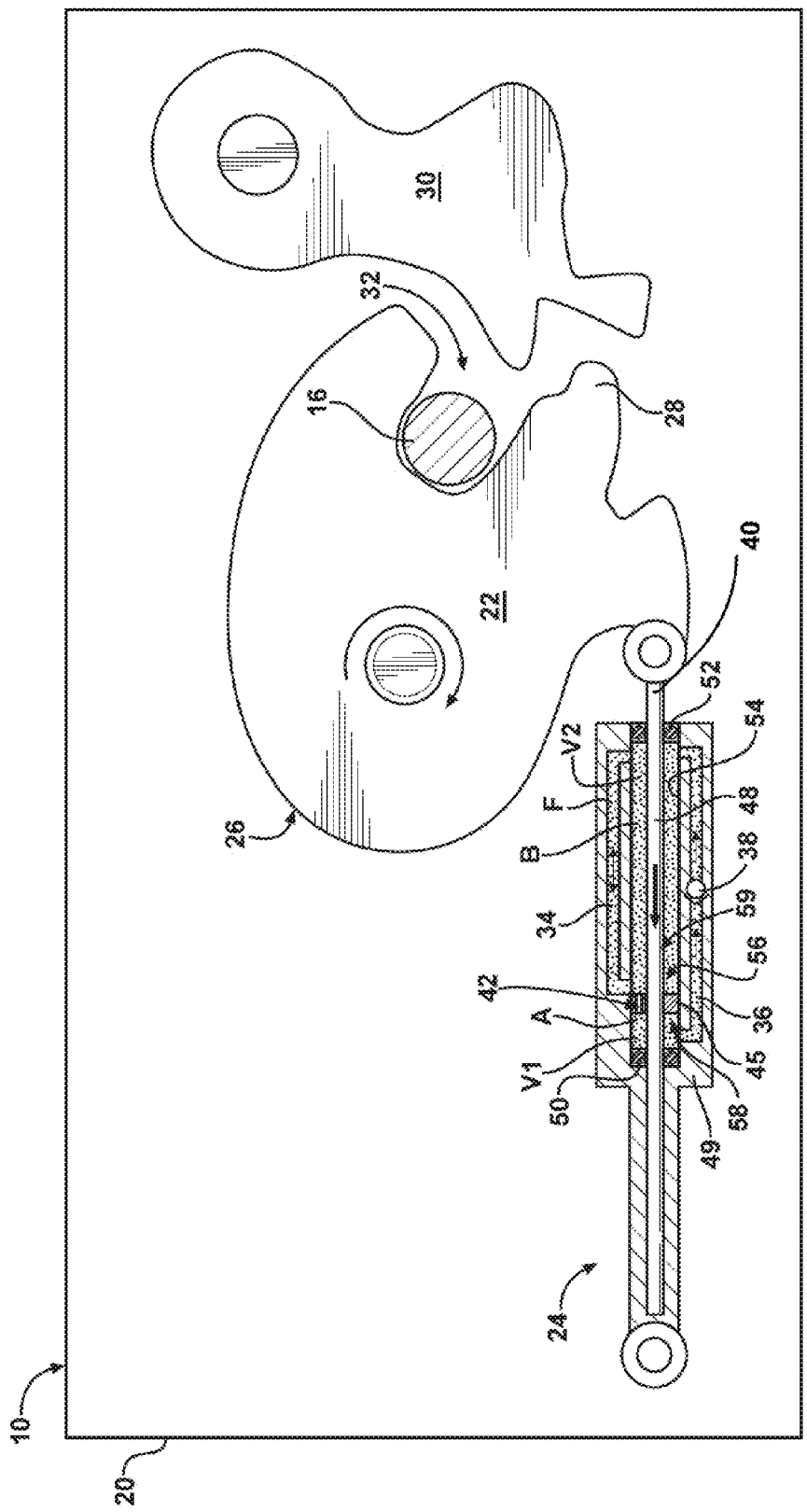
FIG. 6 is a schematic partial cross-sectional view of the latch of FIG. 5 with the forkbolt in the over-travel position.
Figure 7:
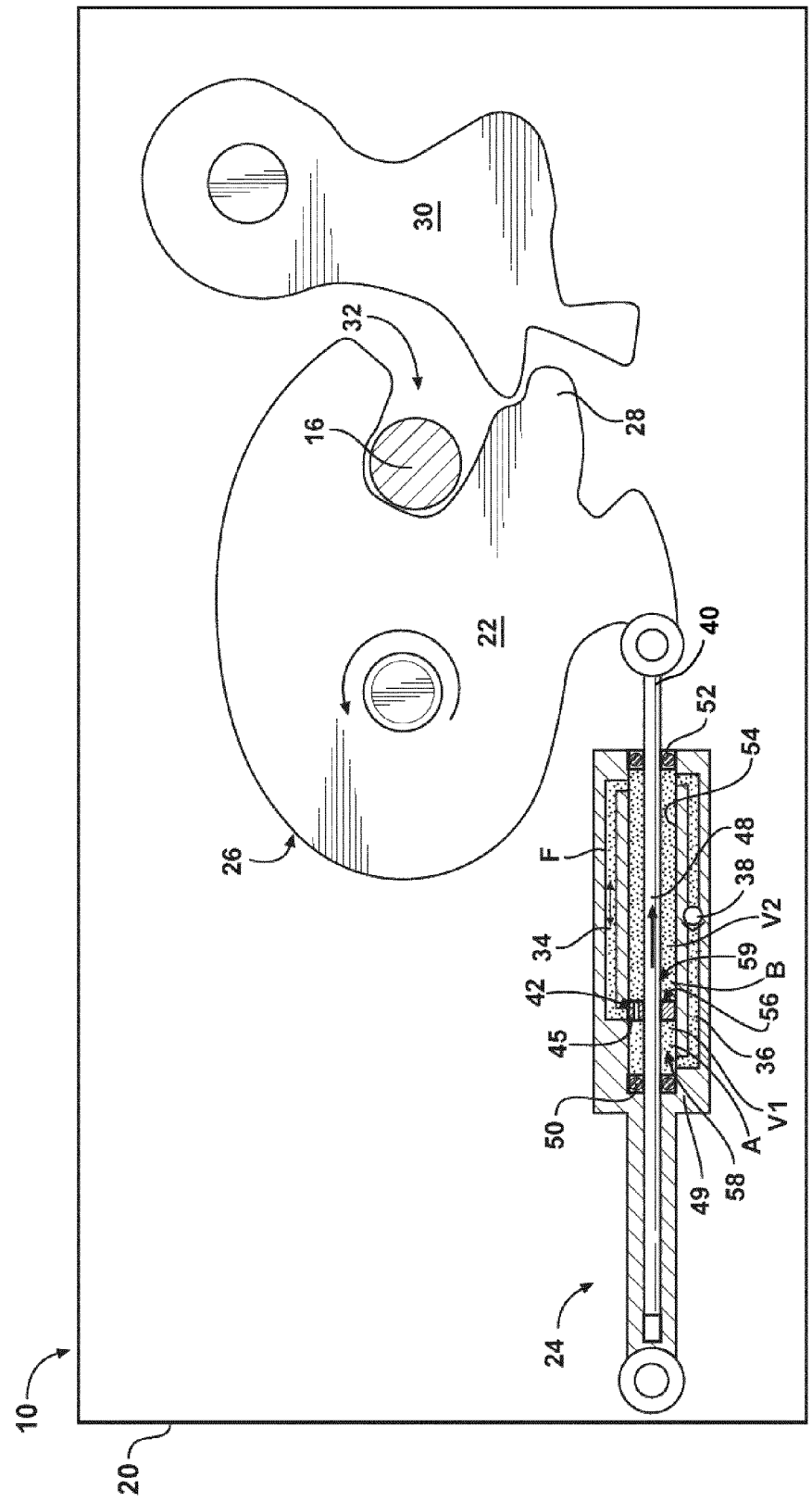
FIG. 7 is a schematic partial cross-sectional view of the latch of FIG. 5 with the forkbolt engaging the striker and in the latched position.

The engagement mechanism 40, as shown in FIGS. 2-4, slidingly engages the periphery 26 of the forkbolt 22 when the periphery of the forkbolt 22 comes into contact with the engagement mechanism 40. In this embodiment, the engagement mechanism 40 slides along the periphery 26 of the forkbolt 22 and the non-uniform shape of the periphery 26 of the forkbolt 22 allows the periphery 26 of the forkbolt 22 to only contact the engagement mechanism 40 when the forkbolt 22 is between the latched position and the over-travel position. Therefore, in this embodiment the forkbolt 22 is not engaged or in contact with the forkbolt 22 when the forkbolt 22 is not between the latched position and the over-travel position. In another embodiment, the engagement mechanism 40 may engage the forkbolt 22 as the forkbolt 22 rotates between the unlatched position and the latched position. In one embodiment, the engagement mechanism 40 is engaged with the periphery 26 of the forkbolt 22 as the forkbolt 22 rotates between each of the positions, as shown in FIGS. 5-7.

Referring to FIGS. 2-4, the damping assembly 24 includes a first piston 45a and a second piston 45b. The first piston 45a may be slidably disposed within the first fluid region A and the second piston 45b may be slidably disposed within the second fluid region B. The total volume of the first fluid region A and the second fluid region B is fixed such that when fluid F is displaced from one of the regions A, B, the fluid F must eventually flow to the other region A, B. The fluid F within each of the fluid regions A, B acts on the respective pistons 45a, 45b. A restriction passage 42 fluidly interconnects the first fluid region A and the second fluid region B. The restriction passage 42 restricts flow of the fluid F between the first fluid region A and the second fluid region B to provide resistance to moving the first piston 45a within the first fluid region A and the second piston 45b within the second fluid region B. The resistance, in turn, slows rotation of the forkbolt 22 as the forkbolt 22 travels between the over-travel position and the latched position. Once the forkbolt 22 reaches the latched position, the detent lever 30 engages the nose 28 of the forkbolt 22 to keep the forkbolt 22 in the latched position. Once the detent lever 30 disengages the nose of the forkbolt 22, the forkbolt 22 can rotate back to the unlatched position. As the forkbolt 22 rotates from the over-travel position to the latched position, as shown in FIG. 3, the periphery 26 of the forkbolt 22 is no longer depressing the engagement mechanism 40 to move the pistons 45a, 45b.

The engagement mechanism 40 operatively connects the first piston 45a and the second piston 45b with the forkbolt 22 such that the engagement mechanism 40 is disposed between each of the pistons 45a, 45b and the forkbolt 22, as shown in FIGS. 2-4. The engagement mechanism 40 slidingly engages the periphery 26 of the forkbolt 22 as the forkbolt 22 rotates from the over-travel position to the latched position. Therefore, due to the non-uniform periphery 26 of the forkbolt 22, the periphery 26 of the forkbolt 22 may only engage the engagement mechanism when the forkbolt 22 is in or between the over-travel position, as shown in FIG. 4, and the latched position, as shown in FIG. 3. The pistons 45a, 45b may extend within their respective passages 34, 36 in spaced and generally parallel relationship. The damping assembly 24 may also include a case 49. The fluid regions A, B are at least partially disposed in the case 49 and the engagement mechanism 40 moves relative to the case 49. The engagement mechanism 40 includes a pivot 64 for pivoting the engagement mechanism 40 relative to the case 49. The pivot 64 is disposed between the first piston 45a and the second piston 45b such that the engagement mechanism 40 pivots about the pivot 64 to move the first piston 45a and the second piston 45b in opposing directions within their respective first and second fluid regions A, B as the periphery 26 of the forkbolt 22 slides along the engagement mechanism 40. Therefore, as the periphery 26 of the forkbolt 22 slides along the engagement mechanism 40, the engagement mechanism 40 pivots or teeters about the pivot 64 to push the corresponding piston 45a, 45b into the respective fluid regions A, B. For example, referring to FIG. 3, as the periphery 26 of the forkbolt 22 causes the engagement mechanism 40 to rotate about the pivot 64, the engagement mechanism 40 moves the first piston 45a into the first fluid region A. The fluid F within the first fluid region A is displaced and moves through a check valve 38 that is disposed between the first fluid region A and the second fluid region B, and into the second fluid region B. Likewise, the second piston 45b is pushed up from the second fluid region B by the fluid being pushed in behind it from the first fluid region A. When the engagement mechanism 40 rotates such that the second piston 45b moves back into the second fluid region B and the first piston 45a moves out of the first fluid region A, fluid is forced from the second fluid region B through the restriction passage 42 and enters the first fluid region A. The restricted flow of the fluid F through the restriction passage 42 causes pivoting of the engagement mechanism 40 to be slowed. The slowed pivoting of the engagement mechanism 40 is imparted to the periphery 26 of the forkbolt 22 as the forkbolt 22 rotates from the over-travel to the latched position. The check valve 38 provides unidirectional flow from the first fluid region A second fluid region B. Therefore, the check valve 38 prevents fluid F from flowing from the second fluid region B to the first fluid region A. The check valve 38 may be a ball valve or any other valve known to those skilled in the art for allowing fluid to flow unidirectionally through the valve.

The damping assembly 24 may also include the first seal 50 that surrounds the first piston 45a within the case 49. In addition, the damping assembly 24 may also include the second seal 52 surrounding the second piston 45b within the case 49. Each of the seals 50, 52 retain the fluid F within the respective fluid regions A, B while the pistons 45a, 45b move within the respective fluid regions A, B.

In another embodiment, shown in FIGS. 5-7, the damping assembly 24 also includes a first passage 34 and a second passage 36. The first passage 34 extends between the first fluid region A and the second fluid region B. The second passage 36 extends between the first fluid region A and the second fluid B. The housing 20 defines a bore 59 that is in fluid communication with the first passage 34 and the second passage 36. A piston 45 is slidably disposed in the bore 59 such that the fluid F within the bore 59 reacts against the piston 45 to add resistance to the movement of the piston 45 that is sufficient to slow rotation of the forkbolt 22. The piston 45 divides the bore 59 into the first fluid region A and the second fluid region B.

The restriction passage 42 fluidly connects the first fluid region A and the second fluid region B. The piston 45 may define the restriction passage 45 as a small hole that extends therethrough to fluidly interconnect the first fluid region A and the second fluid region B. The restriction passage 42 is sized to restrict flow of the fluid F between the first fluid region A and the second fluid region B. By restricting the flow of the fluid F between the first fluid region A and the second fluid region B, a pressure of the fluid F within the first fluid region A and/or the second fluid region B may increase. Because the first fluid region A and the second fluid region B are operatively connected to the engagement mechanism 40, the pressure of the fluid F acting on the piston 45 within the first and second fluid regions A, B adds resistance to movement of the engagement mechanism 40. By virtue of the engagement mechanism 40 being operatively disposed between the forkbolt 22 and each of the fluid regions A, B, rotation of the engagement mechanism 40 is slowed by the resistance imparted by the fluid F within the fluid regions A, B. The resistance, in turn, slows rotation of the forkbolt 22 as the forkbolt 22 rotates between the over-travel position and the latched position.

While the forkbolt 22 rotates from the unlatched position, as shown in FIG. 5, to the over-travel position, as shown in FIG. 6, the forkbolt 22 moves the engagement mechanism 40. The engagement mechanism 40, in turn, moves the piston 45 within the bore 59 to displace the fluid F from the first fluid region A through the second fluid passage 36 and into the second fluid region B. The first fluid passage 34 may be disposed to communicate with the first fluid region A such that except when the forkbolt 22 is in the over-travel position, as shown in FIG. 6, the fluid moves freely through the first fluid passage 34. This means that when the forkbolt 22 is in the over-travel position, the piston 45 is disposed within the bore 59 such that the second fluid passage 36 fluidly extends between the first region A and the second fluid region B while the first fluid passage 34 fluidly extends between only the second fluid region B. Therefore, fluid does not pass to the first fluid region A via the first fluid passage 34 with the forkbolt 22 is in the over-travel position. When the forkbolt 22 is in the latched position, the piston 45 may be disposed within the bore 59 such that the second fluid passage 36 fluidly extends between the first fluid region A and the second fluid region B while the first fluid passage 34 is at least partially blocked at one end thereof by the piston 45. However, when the forkbolt is between the latched position and the unlatched position, both the first and second fluid passages 34, 36 fluidly extend between the first fluid region A and the second fluid region B.

Referring again to FIG. 6, when the forkbolt 22 is between the latched position and the over-travel position, fluid F reacting against the piston 45 adds resistance to the movement of the piston 45. Due to the operative connection of the piston 45 to the engagement mechanism 40 and the operative connection of the engagement mechanism 40 to the forkbolt 22, adding resistance to the piston 45 within the bore 59 slows rotation of the forkbolt 22. In this embodiment, the engagement mechanism 40 may be a rod 48. The piston 45 is operatively connected to the rod 48. The rod 48 may be pivotally connected to the forkbolt 22 and the case 49 may be pivotally attached to the housing 20. When the forkbolt 22 rotates, the rod 48 moves to slide the piston 45 within the bore 59 such that the fluid F within the bore 59 reacts against the piston 45 to slow rotation of the forkbolt 22 as the forkbolt 22 rotates between the over-travel position and the latched position. In this embodiment, the damping assembly 24 may also include a first seal 50 and a second seal 52. The first seal 50 and the second seal 52 surround the rod 48 in spaced relationship, i.e., at opposing ends of the bore 59. By sealing between the rod 48 and the piston 45 within the bore 59, the fluid F is retained within the bore 59 as the rod 48 and the piston 45 move within the bore 59. As the forkbolt 22 is rotating from the over-travel position to the latched position, as shown in FIG. 7, the check valve 38 prevents the fluid F from flowing from the second fluid region B to the first fluid region A via the first fluid passage 36 as the piston 45 moves within the bore 59. Therefore, the fluid F only flows from the second fluid region B to the first fluid region A via the restriction passage when the forkbolt is in the over-travel position. The pressure change caused by movement of the piston 45 is the result of the operative connection to the forkbolt 22 to the engagement mechanism 40. The piston 45 divides the bore 59 into a first chamber 56 and a second chamber 58.

The first passage 34, the second passage 36, and the fluid regions A, B are at least partially disposed in the case 49 such that the case 49 houses the passages 34, 36 and the fluid regions A, B. The engagement mechanism 40 is operatively connected to the case 49 and moves relative to the case 49.

In an alternative embodiment, the restriction passage 42 may be defined into a wall 54 that surrounds the bore 59 such that the fluid F flowing from the second fluid region B to the first fluid region A is restricted to inhibit the flow of the fluid F between the fluid regions A, B. Alternatively, the piston 45 may be slightly undersized relative to the bore 59 such that the restriction passage 42 is defined between the piston 45 and the wall 54 surrounding the bore 59. By undersizing the piston 45 relative to the wall 54, the fluid F flowing between the fluid regions A, B would also be restricted.

While the best modes for carrying out the invention have been described in detail, those familiar with the art to which this invention relates will recognize various alternative designs and embodiments for practicing the invention within the scope of the appended claims.

The invention claimed is:

1. A damping assembly for disposition within a housing of a latch assembly to slow rotation of a forkbolt rotatably disposed within the latch assembly as the forkbolt rotates between an over-travel position and a latched position when latching a door of a vehicle, said damping assembly comprising:
   a first fluid region having a first volume and configured to hold a fluid;
   a second fluid region having a second volume and configured to hold a fluid;
   a piston slidably disposed within one of said fluid regions and configured to change each of said volumes to displace fluid from one of said fluid regions to the other of said fluid regions;
   a check valve interconnecting said first fluid region and said second fluid region and configured to allow unidirectional flow of said fluid from said first fluid region to said second fluid region as said piston moves to decrease said first volume and increase said second volume;
   a restriction passage fluidly connecting said first fluid region and said second fluid region;
   wherein said restriction passage is configured to restrict flow of said fluid from said second fluid region to said first fluid region as said piston moves to increase said first volume and decrease said second volume; and
   an engagement mechanism operatively connected to said piston and configured to engage the forkbolt as the forkbolt rotates between the over-travel position such that rotation of said forkbolt is slowed as said piston moves to increase said first volume and decrease said second volume.

2. A damping assembly, as set forth in claim 1, wherein said fluid is hydraulic fluid.

3. A damping assembly, as set forth in claim 2, wherein said hydraulic fluid is oil.

4. A damping assembly, as set forth in claim 1, wherein said damping device further includes a case, wherein said first fluid region and said second fluid region are at least partially disposed within said case.

5. A damping assembly, as set forth in claim 1, wherein said check valve is disposed between said fluid regions.

6. A damping assembly, as set forth in claim 1, wherein said piston is further defined as a first piston and a second piston;
   wherein said first piston is slidably disposed within said first fluid region and said second piston is slidably disposed within said second fluid region;
   wherein said restriction passage is configured to restrict flow of said fluid from said second fluid region to said first fluid region as said first piston moves to increase said first volume and as said second piston moves to decrease said second volume;
   wherein said engagement mechanism is operatively connected to said pistons and configured to engage the forkbolt as the forkbolt rotates between the over-travel position and the latched position such that rotation of the forkbolt is slowed as said first piston moves to increase said first volume and as said second piston moves to decrease said second volume.

7. A damping assembly, as set forth in claim 6, wherein said engagement mechanism is slidably engageable with a periphery of the forkbolt as the forkbolt rotates between the over-travel position and the latched position.

8. A damping assembly, as set forth in claim 7, wherein said engagement mechanism includes a pivot disposed between said first piston and said second piston and said engagement mechanism rotates about said pivot, relative to said housing, to move said first piston and said second piston in opposing directions within said respective fluid regions as the periphery of the forkbolt slides along said engagement mechanism.

9. A damping assembly, as set forth in claim 6, wherein said damping assembly further includes a first seal and a second seal, wherein said first seal surrounds said first fluid region and said first piston and said second seal surrounds said second passage and said second fluid region to seal said fluid within said fluid regions as said pistons move within said respective fluid regions.

10. A damping assembly, as set forth in claim 1, further comprising a first fluid passage fluidly interconnecting said first fluid region and said second fluid region.

11. A damping assembly, as set forth in claim 10, wherein said check valve is disposed in said first fluid passage to provide unidirectional flow from said first fluid region to said second fluid region.

12. A damping assembly, as set forth in claim 10, further comprising a second fluid passage, wherein said piston is slidable within said one of said fluid regions to fluidly interconnect said first fluid region and said second fluid region.

13. A damping assembly, as set forth in claim 1, wherein said engagement mechanism is a rod adapted for operative connection to the forkbolt and said piston is operatively connected to said rod such that said piston is slidably disposed between said fluid regions.

14. A damping assembly, as set forth in claim 13, wherein said damping assembly further includes a first seal and a second seal surrounding said rod in spaced relationship, wherein said piston is slidably disposed between said seals such that said first seal and said second seal retain said fluid within said fluid regions as said rod and said piston move within said fluid regions.

15. A damping assembly, as set forth in claim 1, wherein said piston defines said restriction passage.

* * * * *